United States Patent [19]

Holton

[11] Patent Number: 4,826,375

[45] Date of Patent: May 2, 1989

[54] VARIABLE DIAMETER SCREW FASTENER

[75] Inventor: Robert J. Holton, Mission Viejo, Calif.

[73] Assignee: Eaton Corporation, Cleveland, Ohio

[21] Appl. No.: 85,822

[22] Filed: Aug. 17, 1987

[51] Int. Cl.$^4$ .................... F16B 37/02; F16B 37/04
[52] U.S. Cl. .................... 411/174; 411/276; 411/437; 411/524
[58] Field of Search ............ 411/106, 112, 167, 174, 411/175, 276, 291, 522–524, 937, 937.1, 971, 437

[56] References Cited

U.S. PATENT DOCUMENTS

| | | | |
|---|---|---|---|
| 2,239,797 | 4/1941 | Tinnerman | 411/524 |
| 2,684,703 | 7/1954 | Crowther | 411/276 |
| 2,684,704 | 7/1954 | Crowther | 411/276 |
| 2,716,434 | 8/1955 | Crowther | 411/174 |
| 4,714,392 | 12/1987 | Muller et al. | 411/524 |

FOREIGN PATENT DOCUMENTS 2835675  2/1980  Fed. Rep. of Germany ...... 411/174

*Primary Examiner*—Neill R. Wilson
*Attorney, Agent, or Firm*—A. E. Chrow

[57] ABSTRACT

Preferred embodiments (60, 70) of a fastener adapted to secure any selected one of a plurality of threaded members (S") are provided. Fastener (60) features substantially parallel spaced-apart flat plate members (2, 4) preferably folded from one piece to provide a resilient end fold (6) connecting them together at one end and which features respective apertures (28, 26) that are axially offset by a distance ("x") and have respective thread engaging edges (24, 20) about at least a portion of their respective peripheries that are oriented to cause at least one of plates (2, 4) to rotate relative the other a distance effective to enable apertures (28, 26) to align sufficiently to enable threaded members ("S") to advance rotationally therethrough with end fold (6) further adapted to impart a resistive force against the threads that is effective to enhance the secured relationship therebetween. Fastener (70) differs from fastener (60) by being adapted such that threaded members ("S) cause the plate members (32, 34) to move in substantially opposite parallel directions rather than rotate relative each other.

12 Claims, 2 Drawing Sheets

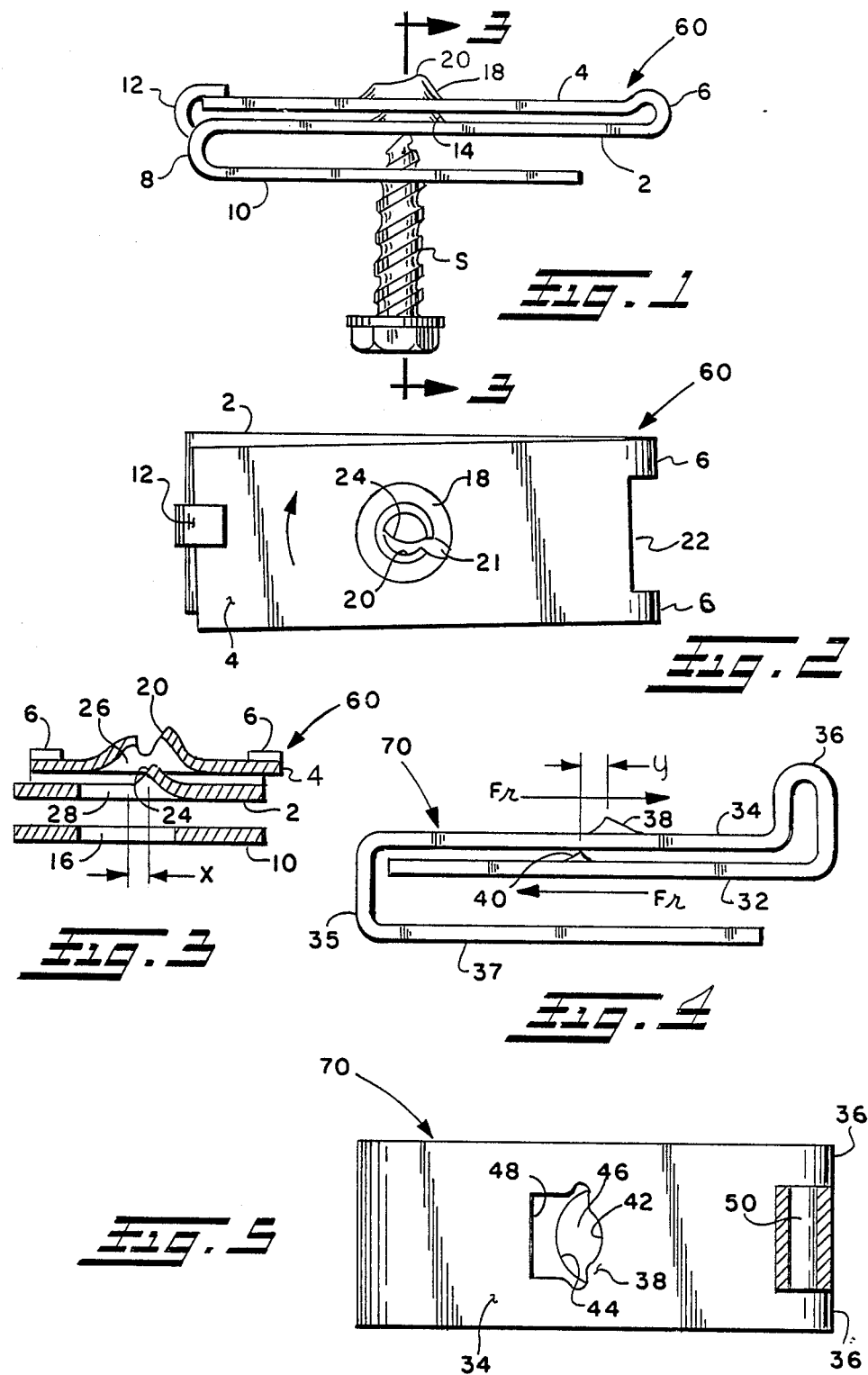

VARIABLE DIAMETER SCREW FASTENER

INTRODUCTION

This invention relates generally to a fastener for securing an externally threaded member such as a screw to a panel or other object and more particularly to a fastener that is adapted to secure any selected one of a plurality of externally threaded members having thread diameters ranging from a minimum to a maximum over a prescribed range.

BACKGROUND OF THE INVENTION

Fasteners for securing an externally threaded member such as a screw through an opening in a panel or other object have characteristically featured a pair of opposed resilient arms overhanging an aperture through which the screw is received and whose respective free-ends are adapted to threadingly engage the threads on opposite sides of the threaded member and enable it to advance rotationally therethrough. Examples of such fasteners are disclosed in U.S. Pat. Nos. 2,288,710; 2,771,113; 4,200,027; and 4,508,477, the disclosures of which are incorporated herein by reference. In other instances, the aperture is surrounded by a projection ending in a helical edge that is adapted to threadingly engage the threads of the threaded member of which examples are disclosed in U.S. Pat. Nos. 2,117,775; 3,570,361; 3,362,278; and 4,201,111, the disclosures of which are incorporated herein by reference.

Heretofore, those fasteners featuring a helical thread engaging edge have characteristically been separately sized for each screw requiring a particular fastener for each screw size and, in addition, have often employed a pair of overhanging opposed resilient arms that engage and impart a force against the threaded member to prevent it from loosening from the fastener.

Fasteners of the aforementioned type, featuring a pair of opposed resilient arms whose free-ends threadingly engage the threads of the threaded member to provide the securement therebetween, are necessarily spread apart as the thread diameter increases which in turn diminishes the included angle between the rotational axis of the threaded member and the arms and accordingly diminishes the radially inwardly directed force component they exert against the threads to prevent the threaded member from loosening.

The fastener of the present invention overcomes the shortcomings of the prior art fasteners hereinbefore described by being able to secure any selected one of a plurality of externally threaded members having thread diameters ranging from a minimum to a maximum over a broad range whilst imparting a force thereagainst whose direction is substantially consistent in being directed radially inwardly and whose value increases as the thread diameter increases from a minimum to a maximum.

SUMMARY OF THE INVENTION

Accordingly, it is an object of this invention to provide a fastener for securing any selected one of a plurality of externally threaded members having a broad range of thread diameters.

It is another object of this invention to provide a fastener for securing any selected one of a plurality of externally threaded members having a broad range of thread diameters that is adapted to impart a force against the threaded members whose direction is substantially consistent over the thread diameter range in being directed radially inwardly against the threaded member and which increases as the thread diameter increases and is highly effective in preventing the threaded member from loosening from the fastener.

BRIEF DESCRIPTION OF THE DRAWINGS

FIG. 1 is a side elevation view of fastener 60 made in accordance with the invention;

FIG. 2 is a top plan view of fastener 60 of FIG. 1;

FIG. 3 is a cross-sectional view taken along line 3—3 in FIG. 1;

FIG. 4 is a side elevation view of fastener 70 made in accordance with the invention;

FIG. 5 is a top plan view of fastener 70 of FIG. 4;

BRIEF DESCRIPTION OF SOME PREFERRED EMBODIMENTS

Figure 6:
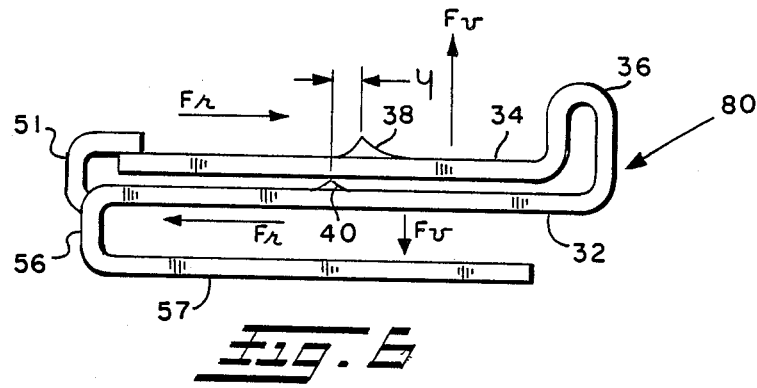
FIG. 6 is a side elevation view of fastener 80 made in accordance with the invention.

In FIG. 1, fastener 60 includes substantially parallel adjacently positioned first plate member 2 and second plate member 4. Fastener 60 is adapted to secure a plurality of externally threaded members such as screw "S" having thread diameters ranging from a minimum to a maximum over a predetermined range for which the fastener is to be used. As hereinafter described, plate members 2 and 4 are secured together by means enabling at least one of them to be moved by screw 3 in a plane substantially parallel relative the other and to apply a resistive force Fr against screw S effective to prevent it from loosening from fastener 60 once the two are secured together.

Although a resilient material such as on elastomeric rubber may be employed to secure plate members 2 and 4 together to provide the ability of at least one to move in a plane substantially parallel relative the other, plate members 2 and 4 are preferably made from one piece that is folded together to provide end fold or bight portion 6 which integrally unites them at one end as shown in FIG. 1. Thus, the upper portion of fastener 60 has a generally "u" shaped configuration with end fold 6 providing the means for securement therebetween.

Although not required for many applications, plate member 2 may include an extension 10 that extends away from plate member 4 such as by a bend referenced by numeral 8 and thence in spaced-apart underlying substantially parallel relationship to the side of plate member 2 facing away from plate member 4 to provide an open-ended clip adapted to clip fastener 60 to an edge of a panel or the like having a hole therethrough through which screw S is to be received.

Plate member 2 has an aperture 28 (shown in FIG. 3) adapted to receive screw S having the maximum thread diameter therethrough. In cases where fastener 60 includes extension 10, extension 10 includes an opening 16 (shown in FIG. 3) that is adapted to receive screw S having the maximum diameter therethrough and enter aperture 28. Opening 16 may be an open-ended slot where such is preferred.

At least a portion of the periphery of plate member 2 about aperture 28 is formed to provide an inwardly facing thread engaging edge 24. Preferably, the periphery is formed into a projection 14 that ends in an inwardly facing helical edge 24 adapted to threadingly engage at least a portion of the threads of screw S as shown in FIGS. 2 and 3. Edge 24 does not have to completely surround aperture 28 and may, for example, extend for about one-half of the peripheral distance thereabout.

Plate member 4 has an aperture 26 therethrough that is adapted to receive screw S having the maximum thread diameter therethrough. At least a portion of the periphery of plate 4 about aperture 26 is formed into a thread engaging edge 20. Preferably, the periphery about aperture 26 is formed into a projection 18 that extends away from plate member 2 and ends in inwardly facing helical edge 20 shown in FIGS. 2 and 3 of which at least a portion is adapted to engage the threads of screw S received through aperture 28. Edge 20, like edge 24, may be interrupted by one or more circumferentially spaced radially extending slots 21 shown in FIG. 2.

As shown in FIG. 3, apertures 26 and 28 are initially axially offset from each other by distance "x" which is provided by the angular displacement of plate member 4 relative plate member 2 shown in FIG. 2. Plate member 4 is initially angularly positioned relative plate member 2 by twisting it at end fold 6. End fold 6 may include a notch 22 shown in FIG. 2 to lessen the force required for twisting plate member 4 angularly relative plate member 2 which in return lowers the resistive force provided by end fold 6 opposing alignment of apertures 26 and 28.

Plate member 2 preferably includes tab 12 that extends about an end of plate member 4 opposite end fold 6 to maintain it in substantial parallel alignment with plate member 2.

In operation, screws S (meaning those having a thread diameter ranging from a minimum to a maximum within a predetermined range) are respectively received through openings 16 and 28 and threadingly engage at least a portion of edge 24 of plate member 2 and rotationally advance through aperture 26 and engage a portion of edge 20 of plate member 4 and exert a force thereagainst. Edges 20 and 24 are oriented relative to each other and to end fold 6, such as by edge 24 facing in a direction generally parallel to the axis of end fold 6, that the force rotates at least one of plates 2 and 4 a distance enabling apertures 26 and 28 to align sufficiently to enable edge 20 to threadingly engage the threads of screws S and then to rotationally advance therethrough and become secured to fastener 60.

As previously described, end fold 6 is resiliently deformable and effective to enable the rotation to occur whilst providing a resilient resistive force Fr opposing alignment of apertures 26 and 28 which is transferred radially inwardly against screw S to prevent it from loosening from fastener 60. As such, the fasteners of the invention are essentially prevailing torque type fasteners where a substantially constant force (prevailing torque) is exerted on the threaded member to prevent loosening. Due to the end fold 6 providing the source for the resistive force, it can be attractively high and can be further tailored by inclusion and varying the size of notch 22 previously described.

Generally, as the diameter of the threads of the threaded members increase from a minimum to a maximum across the predetermined range, apertures 26 and 28 are moved progressively towards alignment until, for the maximum diameter thread, they are substantially axially aligned. Fasteners of the invention featuring relative rotation between plate members provide essentially a "scissors" type grip upon the threaded members with the resistive force (prevailing torque) upon the threaded member progressively increasing as the thread diameter is increased.

In FIG. 4, fastener 70, like fastener 60, is adapted to secure a plurality of externally threaded members having a thread diameter ranging from a minimum to a maximum across a predetermined range but accomplishes such in a different manner.

Fastener 70 has a first plate member 32 that is adjacently positioned and substantially parallel aligned with second plate member 34. Plate members 32 and 34 are preferably folded together from one piece to provide an end fold 36 at one end providing the securement means therebetween. Plate member 34 may include an extension 37 that in this case extends towards and past the end of plate member 32 as referenced by bend 35 an thence in underlying spaced-apart relationship to the side of plate member 32 facing away from plate member 34 to provide an open ended clip for clipping fastener 70 to an edge of a panel or the like as previously described for fastener 60. Extension 37 includes an opening (not referenced) adapted to receive the threaded member having the maximum thread diameter therethrough. Plate members 32 and 34 have respective apertures 46 and 48 therethrough shown in FIG. 5. Apertures 46 and 48 are initially axially offset from each other by distance "Y". Apertures 46 and 48 are least partially surrounded by respective projections 38 and 40 that respectively end in inwardly facing helical thread engaging edges 42 and 44 that are adapted to engage the threads of the threaded members having thread diameters predetermined for use with fastener 70.

End fold 36 is configured, and edges 42 and 44 are oriented relative each other and to end fold 36 such that the predetermined threaded members received through aperture 46 threadingly engage at least a portion of edge 44 and rotationally advance through aperture 48 and engage at least a portion of edge 42 and exert a force thereagainst that aligns apertures 46 and 48 sufficiently to enable the threaded members to threadingly engage edge 42 and advance the threaded members rotationally therethrough to secure them to fastener 70.

Edges 42 and 44 are generally opposed to each other with one facing towards and the other away from end fold 36 such that plate members 32 and 34 are urged in opposite directions transversely to the axis of end fold 36 while maintaining their substantial parallel relationships to each other.

End fold 36 is configured to enable the threaded members to align apertures 46 and 48 sufficiently to enable their securement to fastener 70 and to provide a resistive force opposing their alignment that is effective to prevent the threaded members from loosening from fastener 70. End fold 36 may include variations in notch 50 to tailor the force provided thereby.

Fastener 80 of FIG. 6 is similar to fastener 70 except that it is configured differently such that it features an extension 57 that extends from an end of plate member 32 opposite end fold 36 rather than from plate 34.

Extension 57 extends by means of bend 56 away from plate 34 and thence in spaced-apart underlying relationship to the side of plate member 32 facing away from plate member 34. In the case of fastener 80, a tab 51 is preferably provided that extends from an end of plate member 32 about the end of plate member 34 opposite end fold 36 to maintain the substantial parallel relationship between plate members 32 and 34.

the resultant force vector components Ft comprising the vector sum of the respective radial force Fr and axial force Fv imparted against the threads respectively by upper plate member 34 and lower plate member 32.

TABLE I

|  | Thickness .025 inch | | | | | | Thickness .028 inch | | | | | |
|---|---|---|---|---|---|---|---|---|---|---|---|---|
|  | Notch | | | No Notch | | | Notch | | | No Notch | | |
| AB Screw Size | 8 | 10 | 12 | 8 | 10 | 12 | 8 | 10 | 12 | 8 | 10 | 12 |
| Installation Torque (inch pounds) | 17 | 31 | 34 | 17 | 31 | 34 | 17 | 31 | 34 | 17 | 31 | 34 |
| Prevailing Torque (inch pounds) | 1.8 | 3.8 | 6 | 2.5 | 4.5 | 6.75 | 2.7 | 6.1 | 8.25 | 4.25 | 8.25 | 9.25 |
| Tensile Pull Out Load (pounds) | 605 | 752 | 1562 | 687 | 896 | 1525 | 658 | 901 | 1426 | 868 | 1086 | 1312 |

Figure 7:
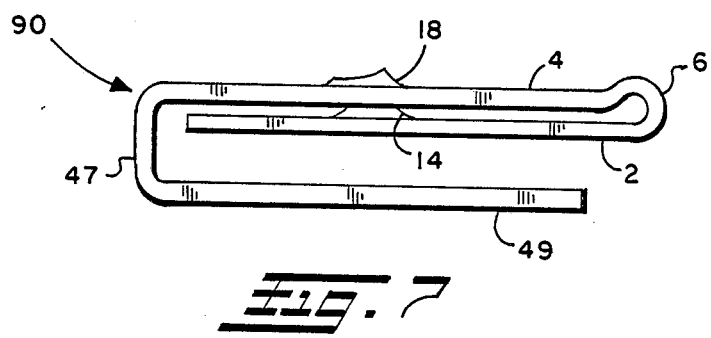
FIG. 7 is a side elevation view of fastener 90 made in accordance with the invention.

Fastener 90 of FIG. 7 is similar to fastener 60 of FIG. 1 excepting that an extension 49 extends from one end of plate member 4 opposite end fold 6 towards and past the end of plate member 2 opposite end fold 6 by means of bend 47 and thence in underlying spaced-apart relationship to the side of plate member 2 facing away from plate member 4 to provide an open-ended clip from clipping fastener 90 to an edge of a panel or the like. Note that for fastener 90 as for fastener 70, a tab is generally not required to maintain the parallel relationship between the plate members of the respective fasteners since, in both case, the lower plate member would be urged towards the upper plate member as the threaded members are advanced rotationally therethrough.

The initial offset between the aperture is such that the threaded members of the range having the minimum diameter is able to threadingly engage the thread engaging edge of the first (lower) plate member and advance rotationally therethrough and thence engage a portion of the thread engaging edges of the second (upper) plate member and exert a force thereagainst urging the aperture sufficiently into alignment to enable the edge to threadingly engage the threads and permit the threaded member to advance rotationally therethrough.

By way of example, a fastener 60 made from both 0.025 and 0.028 spring steel and featuring a width of about 15/32 inch and with and without a centrally located notch in the end fold of about 0.187 inch deep by about 0.250 inch wide exhibited the torque characteristics shown in the following Table I where the fastener was installed and secured to type 8, 10 and 12 AB screws having thread diameters of 0.165 inch, 0.187 inch, and 0.218 inch, respectively. Although not included in the data, the fastener is also suitable for use with type 6 and type 7 AB screws having thread diameters of 0.137 inch and 0.154 inch respectively resulting in a total thread diameter range for AB type screws of 0.137 inch to 0.218 inch.

Figures 8A, 8B:
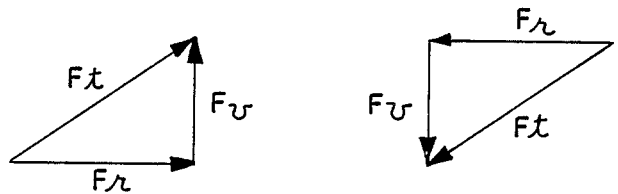
FIGS. 8A and 8B are respective vector diagrams illustrating the total resistive forces Ft imparted by the upper and lower plate members of the fastener of FIG. 6.

Preferably, the plate members of the fastener of the invention are additionally operative to be compressed or move towards each other as the threaded member is rotationally advanced through both apertures which enhances vertical alignment of the threaded member as well as enabling the resilient connection such as an end fold therebetween to exert opposed axial reaction forces Fv against the threads as shown in FIG. 6 which even further enhances the prevailing torque required to be overcome in order to loosen the threaded member from the fastener which, as shown in FIGS. 8A and 8B, are The above data illustrates that installation torque progressively increases with screw diameter which would require the screw to rotate the plate members a greater distance. The data also illustrates the attractive prevailing torque upon the screws that would have to be overcome for the screw to loosen in addition to the exceptionally high pull out load required to pull the screw from the fastener.

What is claimed is:

1. A fastener for securing any selected one of a plurality of externally threaded members having respective thread diameters ranging from a minimum to a maximum over a predetermined range, said fastener characterized by including, substantially parallel first and second plate members,
a first aperture through the first plate member, said first aperture adapted to receive the threaded member having the maximum thread diameter therethrough and having about one-half of the first plate member periphery thereabout formed into an edge adapted to threadingly engage the threads of the threaded members,
a second aperture through the second plate member, said second aperture adapted to receive the threaded member having the maximum thread diameter therethrough from the first aperture and having the second plate member periphery thereabout formed into an edge adapted to threadingly engage the threads of the threaded members,
said first and second apertures axially offset from each other by a distance predetermined to enable the threads of each of the threaded members to threadingly engage the thread engaging edge of the first plate member and advance rotationally therethrough and thence engage the thread engaging edge of the second plate member and apply a force thereagainst urging at least one of the first and second plate members transversely in a direction causing the first and second apertures to align sufficiently to enable at least a portion of the thread engaging edge of the second plate member to threadingly engage the threads thereof and enable the threaded member to rotationally advance therethrough and secure the fastener to the threaded member, and
means for securing the first and second plate members together, said means adapted to enable each of the threaded members to align the first and second apertures sufficiently for securement of the fastener thereto whilst imparting a substantially resilient resistive force in a direction against the threads effective to enhance the secured relationship between the fastener and the threaded member.

2. A fastener for securing any selected one of a plurality of externally threaded members having respective thread diameters ranging from a minimum to a maximum over a predetermined range, said fastener characterized by including, substantially parallel first and second plate members, a first aperture through the first plate member, said first aperture adapted to receive the threaded member having the maximum thread diameter therethrough and having about one-half of the first plate member periphery thereabout formed into an edge adapted to threadingly engage the threads of the threaded members, a second aperture through the second plate member, said second aperture adapted to receive the threaded member having the maximum thread diameter therethrough from the first aperture and having about one-half of the second plate member periphery thereabout formed with an edge adapted to threadingly engage the threads of the threaded members, said first and second apertures axially offset from each other by a distance predetermined to enable the threads of each of the threaded members to threadingly engage the thread engaging edge of the first plate member and advance rotationally therethrough and thence engage the thread engaging edge of the second plate member and apply a force thereagainst urging at least one of the first and second plate members in a direction causing the first and second apertures to align sufficiently to enable at least a portion of the thread engaging edges of the second plate member to threadingly engage the threads thereof and enable the threaded member to rotationally advance therethrough and secure the fastener to the threaded member, and means for securing the first and second plate members together, said means adapted to enable each of the threaded members to align the first and second apertures sufficiently for securement of the fastener thereto whilst imparting a substantially resilient resistive force in a direction against the threads effective to enhance the secured relationship between the fastener and the threaded member.

3. The fastener of claim 1 or 2 wherein the first and second plate members are integral with each other along an end fold to provide a generally "u" shaped configuration with the end fold comprising the means for securement therebetween.

4. The fastener of claim 3, wherein the thread engaging edges of the first and second plate members are oriented relative to each other and to the end fold and the end fold is configured such that the force imparted by the threaded members upon the first and second plate member thread engaging edges causes at least one of the first and second plate members to move in direction substantially transverse to the end fold.

5. The fastener of claim 3, wherein the thread engaging edges of the first and second plate members are oriented relative to each other and to the end fold such that the force imparted by the threaded members upon the first and second plate member thread engaging edges causes at least one of the first and second plate members to rotate relative the other in a plane substantially parallel thereto.

6. The fastener of claim 5, including a tab that extends towards the second plate member from an end of first plate member opposite the end fold, said tab folded over an end of the second plate member opposite the end fold and adapted to maintain the substantially parallel relationship therebetween.

7. The fastener of claim 1 or 2 wherein the thread engaging edges of the first and second plate members are helical thread engaging edges.

8. The fastener of claim 1 or 2 wherein the first plate member includes an extension that extends from one of the first and second plate members and thence in an underlying spaced-apart relationship to the first plate member in the side thereof facing away from the second plate member to provide and open-ended clip with said extension having an opening adapted to enable the threaded member having the maximum thread diameter to be received therethrough and into the first aperture.

9. A one-piece fastener for securing any selected one of a plurality of externally threaded members having respective thread diameters ranging from a minimum to a maximum over a prescribed range, said fastener characterized by including:

substantially parallel first and second plate members integral with each other along an end fold to provide a generally "u" shaped configuration, a first aperture through the first plate member, said first aperture adapted to receive the threaded member having the maximum thread diameter therethrough and having about one-half of the first plate member periphery thereabout formed into a projection that extends towards the second plate member and ends in a helical edge adapted to threadingly engage the threads of the threaded members, a second aperture through the second plate member, said second aperture adapted to receive the threaded member having the maximum thread diameter therethrough from the first aperture and having at least a portion of the second plate member periphery thereabout formed into a projection that extends away from the first plate member and ends in a helical edge adapted to threadingly engage the threads of the threaded members.

said first and second apertures axially offset from each other by a distance predetermined to enable the threads of the threaded members of threadingly engage the thread engaging edge of the first plate member and advance rotationally therethrough and thence engage the thread engaging edge of the second plate member, said first and second plate member thread engaging edges oriented relative to each other and to the end fold such that the threaded members apply a force against the first and second plate members causing at least one of the first and second plate members to rotate relative the other in a direction causing the first and second apertures to align sufficiently to enable at least a portion of the thread engaging edge of the second plate member to threadingly engage the threads thereof and enable the threaded member to rotationally advance therethrough and secure the fastener to the threaded member, and said end fold adapted to enable said rotation to occur whilst imparting a substantially resilient resistive force in a direction against the threads effective to enhance the secured relationship therebetween.

10. The fastener of claim 9 including an extension that extends from one of the first and second plate members from an end thereof opposite the end fold and thence in underlying spaced-apart relationship to the first plate member on the side thereof facing away from the second plate member to provide an open-ended clip with said extension having an opening adapted to enable the threaded member having the maximum thread diameter to be received therethrough and into the first aperture.

11. The fastener of claim 9 including a tab extending towards the second plate member from an end of the first plate member opposite the end fold and thence folded about an end of the second plate member opposite the end fold to maintain the substantial parallel relationship therebetween.

12. The fastener of claim 1 or 9 wherein the first and second plate members are additionally operative to move towards each other and enhance vertical alignment of the threaded member as the threaded member is rotationally advanced through the first and second apertures.

* * * * *